United States Patent [19]
Arya

[11] 4,162,018
[45] Jul. 24, 1979

[54] METHOD FOR CONTAINER LOADING AND UNLOADING

[75] Inventor: Satya P. Arya, San Diego, Calif.

[73] Assignee: General Atomic Company, San Diego, Calif.

[21] Appl. No.: 922,438

[22] Filed: Jul. 6, 1978

Related U.S. Application Data

[63] Continuation of Ser. No. 790,588, Apr. 25, 1977, abandoned, which is a continuation of Ser. No. 658,391, Feb. 17, 1976, abandoned.

[51] Int. Cl.² .............................................. B65G 47/91
[52] U.S. Cl. .................................... 414/786; 414/752; 414/416; 294/64 R
[58] Field of Search ................ 214/1 BB, 1 BS, 1 BT, 214/1 BV, 8.5 D, 6 M, 152, 301, 302, 309, 658, 1 BH, 6.5, 6 F, 6 R; 294/64 R, 65, 87 R; 53/244, 247

[56] References Cited

U.S. PATENT DOCUMENTS

| 2,819,805 | 1/1958 | Vieth | 214/6 M |
|---|---|---|---|
| 2,828,877 | 4/1959 | Webster | 214/309 |
| 2,980,265 | 4/1961 | Johnson | 214/1 BB |
| 3,190,459 | 6/1965 | Kochalski | 214/1 BT |
| 3,219,380 | 11/1965 | Carliss | 294/64 |
| 3,415,388 | 12/1968 | Hornlein | 294/64 |
| 3,431,698 | 3/1969 | Bathellier | 214/6 M |
| 3,485,393 | 12/1967 | Wilder | 294/64 X |
| 3,599,396 | 8/1971 | Schmermund | 294/64 X |

FOREIGN PATENT DOCUMENTS 1939962 8/1969 Fed. Rep. of Germany ........ 214/1 BT

Primary Examiner—Albert J. Makay
Assistant Examiner—George F. Abraham
Attorney, Agent, or Firm—Fitch, Even & Tabin

[57] ABSTRACT

A method and apparatus for pneumatically loading an array of nuclear fuel rods into suitable storage containers and also for removing them therefrom. Within the method and apparatus, a vacuum is developed to hold the fuel rods in place upon a transfer unit, the vacuum condition being selectively terminated in order to release the fuel rods for unloading. Preferably, air pressure is employed to more rapidly eliminate the vacuum condition and facilitate release of fuel rods. The vacuum condition is maintained by outside air flow restricting passages if one or more fuel rods are missing from the array to be transferred.

3 Claims, 5 Drawing Figures

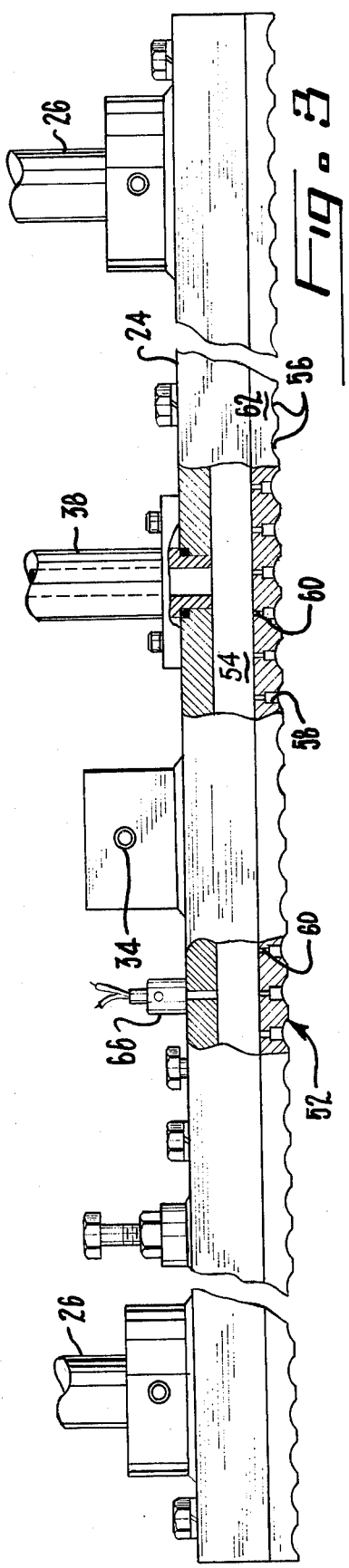
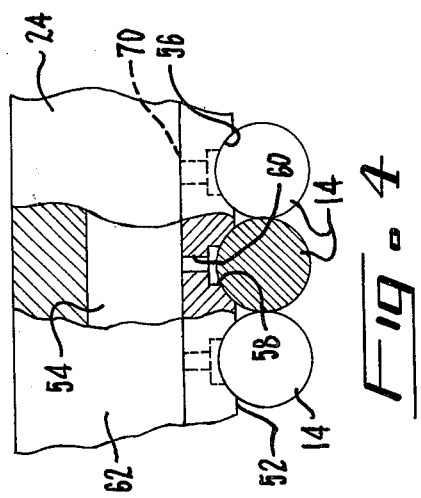
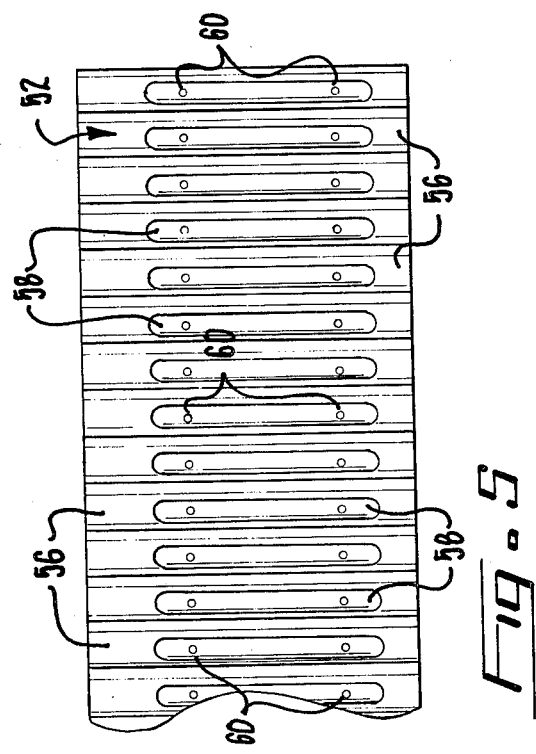

4,162,018

METHOD FOR CONTAINER LOADING AND UNLOADING

This is a continuation, division, of application Ser. No. 790,588, filed Apr. 25, 1977, which, in turn, is a continuation of Ser. No. 658,391, filed Feb. 17, 1976 both now abandoned.

BACKGROUND OF THE INVENTION

The present invention relates to a method and apparatus for the loading and unloading of an array of parts. The method and apparatus of the present invention is particularly adapted for the handling of nuclear fuel rods in a fuel element fabrication facility.

In various manufacturing operations as well as in other applications, it is often desirable to provide automated means for rapidly processing large numbers of parts. Such an operation is particularly contemplated by the present invention in relation to the fabrication of nuclear fuel rods. Many thousands of such rods must be produced and suitably stored in order to permit economic operation of nuclear reactors wherein the fuel elements or rods are employed.

Because of the nature of the radioactive fuel elements, it is further necessary to provide a substantially automated operation with the fuel rods being stored in batches in separate storage containers designed so that the metal densities of the container arrays are maintained within satisfactory limits. Accordingly, a very large number of storage containers are required within a fuel element fabrication facility for this purpose. Such a facility may be considered as having a number of major subsystems or processings steps including: (1) particle blending, (2) fuel rod formation, (3) fuel rod storage, (4) fuel rod loading, (5) fuel rod carbonization and heat treatment, and (6) final fuel element assembly. The formed fuel rods must be transferred a number of times before they are finally assembled into a complete nuclear fuel element. Accordingly, within such a facility, a number of intermediate storage areas are employed as well as a main storage area for the finished nuclear fuel rods prior to their assembly into fuel elements. In the past, it has been common to employ tubular storage units capable of storing the fuel rods in approximately the same arrangement within which the fuel rods are finally assembled into a fuel element. However, such containers are relatively expensive because of their complex shapes. In addition, loading and unloading of the tubular containers has been relatively slow because of the need for aligning the tubes with devices or mechanisms employed to load and unload the fuel rods.

SUMMARY OF THE INVENTION

It is therefore an object of the present invention to provide a method and apparatus for container loading and unloading in order to overcome one or more problems of the type described above.

It is a more particular object of the present invention to provide such a method and apparatus for loading and unloading nuclear fuel rods or other parts from containers of particularly simple design.

It is a further object of the invention to provide a method and apparatus wherein a sequential array of fuel rods or other parts may be handled by pneumatic transfer means capable of selectively securing the fuel rods or the like in place by means of a developed vacuum condition.

It is an even further object of the invention to adapt the method and apparatus for securing the parts in place even if one or more of the parts are missing from the sequential array.

It is also a further object of the invention to provide such a method and apparatus wherein the parts may be loaded into and unloaded from a storage container having inside dimensions only slightly larger than the dimensions for the sequential array of parts.

Additional objects and advantages of the invention are made apparent in the following description having reference to the accompanying drawings.

DESCRIPTION OF THE DRAWINGS

FIG. 3 is a side view in elevation, with parts in section, of a pneumatic transfer unit according to the present invention.

FIG. 4 is a further enlarged, fragmentary view similar to FIG. 3 while more clearly illustrating internal construction of the transfer unit.

FIG. 5 is a plan view of a pick-up surface of the transfer unit of FIG. 3.

DESCRIPTION OF THE PREFERRED EMBODIMENT

As indicated above, the present invention relates to a method and apparatus for loading and unloading an array of multiple parts into and out of a suitable container. The method and apparatus of the present invention are particularly contemplated for use in one or more transfer stations within a nuclear fuel element fabrication facility. One such typical transfer station is described in detail below. However, it will be apparent from the following description that the method and apparatus of the present invention may also be employed to provide for the automated loading and unloading of a large variety of other parts as well.

Figure 2:
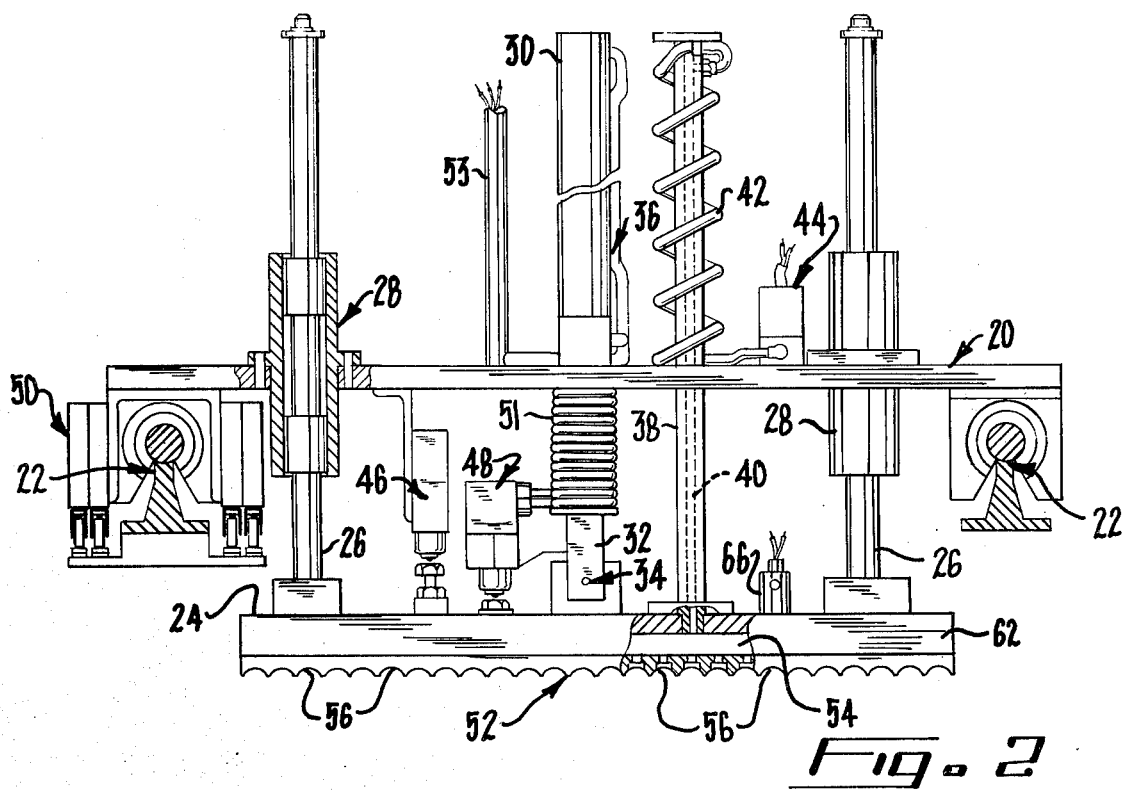
FIG. 2 is a partial side view in elevation of a transfer device embodying the method and apparatus of the present invention for use in such a transfer station.
Figure 1:
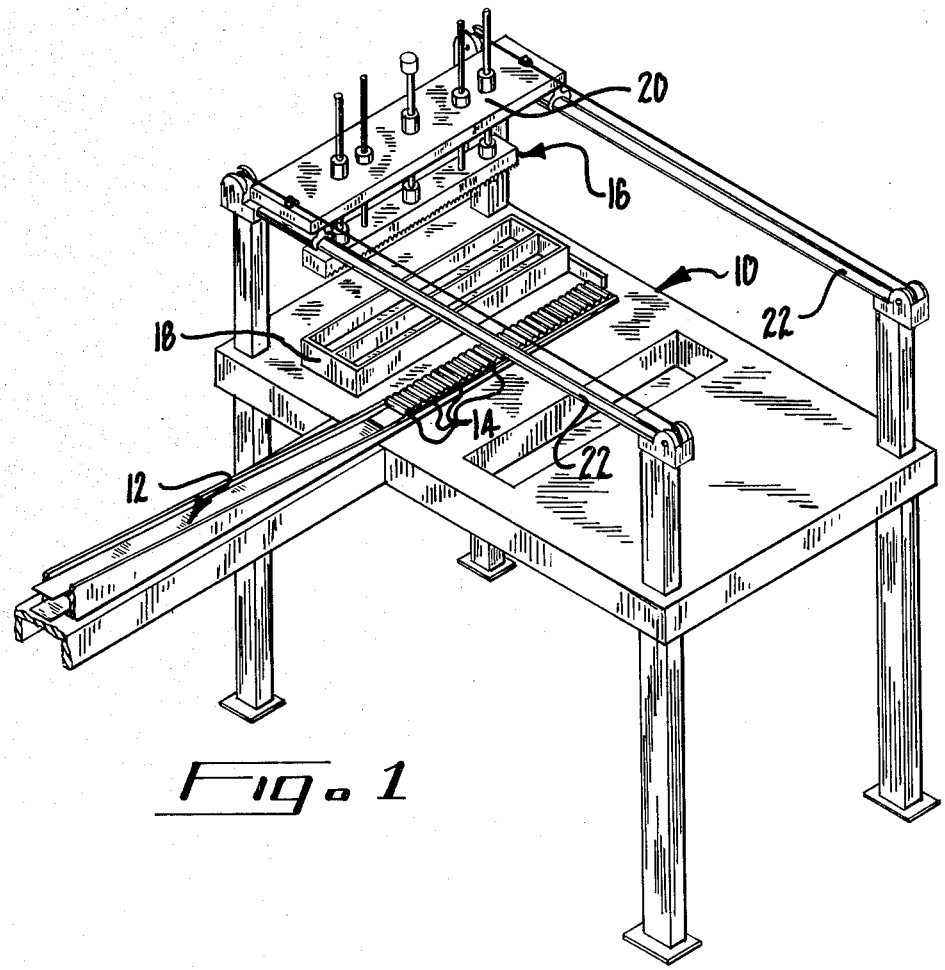
FIG. 1 is an isometric view of a transfer station adapted to use the method and apparatus of the present invention within a nuclear element fabrication facility.

Referring now to the drawings and particularly to FIG. 1, a transfer station of a type employed at one or more locations within a nuclear fuel element fabricating facility is generally indicated at 10. The transfer station 10 is illustrated for the purpose of permitting a more complete understanding of the manner in which the method and apparatus of the present invention may be used. Accordingly, the transfer station is described only briefly below before proceeding with a detailed description of the pneumatic transfer device illustrated in detail in FIGS. 2–5.

As additional background, large numbers of nuclear fuel rods are produced daily in such facilities. For example, it is contemplated that the method and apparatus of the present invention as employed within the transfer station 10 are to be capable of handling as many as 3,600 nuclear fuel rods per hour, either in a loading or unloading mode. The fuel rod may have typical uniform dimensions of approximately 0.62 inches (1.57 centimeters) in diameter and approximately 2.44 inches (6.20 centimeters) in length.

Referring now to FIG. 1, the transfer station 10 includes an elongated conveyor 12 along which large numbers of fabricated fuel rods 14 are introduced to the transfer station. A pneumatic loading and unloading device according to the present invention is generally indicated at 16 for simultaneously transferring an array of the fuel rods from the platform 12 into a suitable storage container generally indicated at 18. Unlike the tubular storage containers of the prior art as described above, the storage container 18 is of particularly simple construction. Preferably, the storage container 18 is formed as a rectangular box with internal compartment dimensions only somewhat larger than an array of fuel rods to be loaded into the container as a single layer. For example, it is particularly contemplated that the loading and unloading device 16 be capable of transferring up to 40 fuel rods arranged in abutting parallel relation. Accordingly, the container 18 is formed with one or more internal chambers each having a width just greater than the length of the fuel rods and a length only slightly exceeding the composite dimension of the fuel rod array. The depth of each internal chamber within the container 18 may, for example, accommodate up to eight layers of as many as 40 fuel rods each. Thus, each container may be nominally loaded with 320 fuel rods in each of two internal compartments.

Before leaving FIG. 1, it is noted that the loading and unloading device 16 is adapted to move the fuel rods both vertically and horizontally in order to transfer them between the conveyor 12 and the storage container 18. A bridge 20 is movably supported by tracks 22 to provide for horizontal motion within the transfer station. The loading device also includes a transfer hand 24 (see FIG. 2), which is adapted to pneumatically secure the fuel rods in place during transfer. The transfer hand 24 is described in substantial detail below. Support rods 26 are secured to opposite ends of the transfer hand 24 and pass through guides 28. A pneumatic cylinder 30 mounted upon a central portion of the bridge 20 has a downwardly extending rod 32 which is pivotably connected at 34 to the transfer hand 24. Pneumatic conduits 36 are in communication with both the head and rod ends of the cylinder 30 in order to provide for both extension and retraction of the rod 32 in order to raise and lower the transfer hand 24.

Pneumatic evacuation or pressurization within the transfer hand 24 as discussed in greater detail below is accomplished by means of a tube 38 secured to the transfer hand 24 and extending upwardly through the bridge 20. The tube 38 has an internal passage 40 connected at the upper end of the tube 38 with an accordion-like pneumatic conduit 42 which is also in communication with a control valve 44. The valve 44 is in communication with a vacuum pump or the like (not shown) for developing a vacuum condition within the transfer hand 24 as discussed below. Preferably the valve 44 is also in communication with a source of air-pressure (also not shown) which may be selectively employed as described below in order to increase the operating rate of the loading device.

The loading device 16 also includes electrical components for controlling operation of both the pneumatic cylinders 30 and the control valve 44. It is obvious that horizontal movement of the bridge along the tracks 22 may be accomplished by similar motor means (not shown), for example, a double-acting jack or cylinder which could also be controlled by such electrical components. The electrical control circuit is not shown in detail since it is not a critical feature of the present invention. Any generally conventional control arrangement could be employed for this purpose.

Within the loading device, a limit switch 46 determines when the transfer hand 24 is raised sufficiently to permit horizontal transport by the bridge 20. An additional limit switch 48 determines when the transfer hand 24 is lowered toward a position adjacent the loading conveyor 12 suitable for loading (or unloading). At the same time, a plurality of cam switches 50 may be employed to indicate when the bridge 20 is located in one or more positions along the track 22. For example, various ones of the cam switches 50 may be employed to indicate alignment of the transfer hand 24 with either the loading conveyor 12 or with one of the two internal chambers within the storage container 18. An accordion-like electrical conduit 51 maintains an electrical connection for the switch 48. A service tube 53 protects both the electrical and pneumatic conduits, particularly during relative movement of the bridge 20.

Referring now to FIGS. 3-5, the transfer hand 24 has a pick-up surface 52 which closely conforms to a surface portion on each of a series of fuel rods (see FIG. 4).

Referring initially to FIG. 3, the transfer hand 24 is of fabricated construction and has an internal manifold chamber 54 extending substantially along its entire length. The chamber 54 is in open communication with the passage 40 in the tube 38.

The pick-up surface 52 on a bottom plate 62 of the transfer hand 24 includes a series of cylindrical recesses 56, each configured to closely conform with the cylindrical surface of one of the fuel rods 14. As may be seen in FIG. 4, the cylindrical recesses 56 have selected depths and relative spacings therebetween enabling them to engage a sequence of parallel, abutting fuel rods.

Referring particularly to FIG. 5, it may be seen that an elongated groove 58 is formed along the center of each cylindrical recess 56. Each of the grooves 58 is in communication with the manifold chamber 54 by means of one or more small passages 60. Preferably two such passages are provided for each of the grooves 58.

To further facilitate intimate engagement of the cylindrical recess 56 with the respective fuel rod, the pick-up surface 52 of the bottom plate 62 is preferably formed from a relatively soft material, for example, a plastic, to more nearly assure that the groove 58 is closed by the fuel rod and at the same time to prevent damage to the fuel rods.

With such an arrangement, the dimensions of the transfer hand 24 may be selected to closely approximate the internal chambers within the storage container 18. Referring particularly to FIG. 5, the width of the pick-up surface 52 on the transfer hand 24 may be approximately the same or slightly shorter than the length of the fuel rods 14. Similarly, the ends of the pick-up surface 52 on the transfer hand 24 may also be configured so that there is substantially no overlap beyond the composite dimension for the fuel rod array. This feature facilitates both loading and unloading while permitting a storage container to be of particularly simple design. For example, the internal chambers within the storage container 18 may have dimensions selected to prevent or limit relative movement of the fuel rod array placed therein in order to facilitate subsequent engagement of the pick-up surface 52 with the fuel rods when it is desired to remove them from the container.

In operation, the bridge 20 is moved along the tracks 22 (see FIG. 2) until the pick-up surface 52 on the transfer hand 24 is directly over the fuel rods 14. The transfer hand 24 is then moved downwardly by operation of the cylinder 30 until the switch 48 indicates that the pick-up surface 52 is in close proximity to the fuel rods 14. For example, it has been found that the transfer hand 24 may pick up all of the fuel rods with certainty if the cylindrical recesses 56 are brought within a distance of, for example, 0.125 inches (0.32 centimeters) of the fuel rod surfaces. Upon evacuation of the manifold chamber 54, the respective fuel rods 14 are secured within the respective cylindrical recesses 56 by means of the vacuum condition developed within the respective grooves 58.

If one or more of the fuel rods should be missing from the array along the pick-up surface 52, only a small amount of air enters through the restricted passages 60 so that a vacuum is maintained inside the chamber 54 and the grooves 58. In this manner, firm engagement of the fuel rods in the remaining grooves 58 is assured.

With the fuel rods secured against the cylindrical recesses 56 by the vacuum condition developed in the groove, the transfer hand 24 is again raised by retraction of the cylinder 30. Elevation of the transfer hand may, for example, be terminated by the limit switch 46. The bridge 20 is then moved horizontally into alignment with one of the internal chambers of the storage container 18. The transfer hand is again lowered by the cylinder 30 until the fuel rods are properly positioned within the storage container. The fuel rods are then released by terminating the vacuum condition within the manifold chamber 54. In order to facilitate and assure release of the fuel rods, it is particularly contemplated that the valve 44 or an additional valve 66 be adapted to permit pneumatic pressurization of the manifold chamber 54. Such pressurization serves to more rapidly overcome the vacuum condition within the chamber 54 and at the same time tends to prevent any of the fuel rods from sticking within the recesses 56.

The transfer hand 24 may then be returned to the loading conveyor 12. As soon as an array of fuel rods is removed by the transfer hand, additional fuel rods may move into place for pick-up by the transfer hand.

In reverse operation, the transfer hand 24 is lowered into one of the internal compartments of the storage container 18. A layer of fuel rods is secured to the pick-up surface 52 by evacuation of the manifold chamber 54. The fuel rods may then be transferred to any desired location by vertical movement of the transfer hand 24 and horizontal movement of the bridge 20.

It will be obvious to those skilled in the art that various modifications of the present invention are possible in addition to those specifically shown in the patent drawings and described above. For example, the configuration and mode of operation for the loading device in accomplishing both horizontal and vertical travel of the transfer hand 24 may be accomplished by other means such as a conventional robot unit or two-axis numerically controlled table. Accordingly, the scope of the present invention is to be determined only from the following appended claims.

What is claimed is:

1. A method of loading or unloading elongated cylindrical radioactive nuclear fuel rods disposed in side-to-side relation to or from each of three separate locations, at least one of said locations having a container with four upstanding sidewalls, said method comprising the steps of:

supporting said container on a stationary surface for loading an array of cylindrical fuel rods into or unloading of an array of articles from said container, supporting an array of cylindrical fuel rods on a stationary support surface at a second location in side-by-side relationship with their cylindrical surface being uppermost, shifting a bridge means horizontally and operating switch means when said hand is in alignment with each one of said three separate locations, after operating a switch indicating alignment with said first location, lowering a transfer hand having a plurality of suction surfaces for holding the cylindrical surfaces of said fuel rods in an array and in side-by-side relation within an open space defined by said four upstanding walls of said container, operating a switching means to stop further downward movement of said transfer hand when said transfer hand and array are located at the proper height in said container depending upon the number of layers in said container, decreasing the vacuum in said transfer hand to release said nuclear fuel rods in said container when loading fuel rods in said container, providing a vacuum sufficient to grip cylindrical surfaces of array of said nuclear fuel rods in said container when unloading said container, raising said transfer hand from said container and above said upstanding side walls of said container, moving said bridge means in the reverse direction to a position associated with a further switch means associated with said second location, lowering said transfer hand toward said support surface and decreasing said vacuum in said transfer hand means to deposit an array of side-by-side fuel rods at said support surface when depositing fuel rods at said second location, increasing said vacuum in said transfer hand to lift an array of fuel rods from said support surface when removing fuel rods therefrom, shifting said bridge means to said third location to operate a third switch means indicating alignment of said bridge means with said third location, lowering said transfer hand and increasing said vacuum in said hand to remove an array of fuel rods at said third location, decreasing said vacuum to deposit an array fuel rods at said third location, and raising said transfer hand and moving said bridge means to either said first or second locations.

2. A method of transferring elongated cylindrical fuel rods disposed side-by-side in an array with the fuel rods being disposed substantially horizontally and in adjacent parallel relation, said method comprising the steps of:

conveying an array of said fuel rods into a first position for transfer to a container having four upstanding side walls, shifting a transfer means including surfaces conforming generally to portions of the cylindrical side walls of said array of said horizontally disposed fuel rods into engagement with said fuel rods and producing a vacuum condition within said transfer means to secure an array of fuel rods to the transfer means, raising said transfer means and lifting an array of fuel rods and transferring the same in a direction transverse to the direction of conveying, lowering an array of fuel rods and a portion of said transfer means into said container to abut the incoming array with the uppermost layer of any previously laid layer of fuel rods therein, terminating the vacuum condition in said transfer means and releasing the fuel rods in said container, lifting said transfer means from said container and shifting said transfer means to said first position and lowering said transfer means to engage another array of fuel rods, producing a vacuum condition in said transfer means to secure an array of fuel rods to the transfer means, raising the transfer means and lifting an array of fuel rods and transferring the same in a transverse direction to a third location, lowering the array of articles and said transfer means at said third location and terminating the vacuum condition within the transfer means in order to release the array of fuel rods at said third location, and subsequently reversing said steps to remove an array of fuel rods from a container at said first position or an array of fuel rods from said third location and conveying the same to said conveying means and terminating the vacuum in said transfer means at said conveying means to deposit fuel rods at said conveying means so that fuel rods may be loaded or unloaded at each of at least three separate positions or locations.

3. A method in accordance with claim 2 in which said third location is another container having four side walls disposed adjacent to and align with said first container and in which the step of lowering the transfer means to said third location and lifting said transfer means from said third location includes the step of moving said transfer means vertically within said other container.

* * * * *